(12) United States Patent
Paoletti (10) Patent No.: US 9,213,090 B2
(45) Date of Patent: Dec. 15, 2015

(54) SURVEILLANCE SYSTEM WITH RADIO-WAVE CAMERA

(76) Inventor: Paolo Alberto Paoletti, Rome (IT)

( * ) Notice: Subject to any disclaimer, the term of this patent is extended or adjusted under 35 U.S.C. 154(b) by 472 days.

(21) Appl. No.: 13/637,595

(22) PCT Filed: Mar. 31, 2011

(86) PCT No.: PCT/EP2011/055024
§ 371 (c)(1),
(2), (4) Date: Dec. 7, 2012

(87) PCT Pub. No.: WO2011/121081
PCT Pub. Date: Oct. 6, 2011

(65) Prior Publication Data
US 2013/0194126 A1 Aug. 1, 2013

(30) Foreign Application Priority Data
Apr. 1, 2010 (IT) .............................. RM2010A0152

(51) Int. Cl.
*G01S 13/86* (2006.01)
*G01S 13/04* (2006.01)
*G01S 13/87* (2006.01)
*G01S 13/93* (2006.01)

(52) U.S. Cl.
CPC .............. *G01S 13/04* (2013.01); *G01S 13/867* (2013.01); *G01S 13/87* (2013.01); *G01S 13/931* (2013.01); *G01S 13/9303* (2013.01); *G01S 13/9307* (2013.01); *G01S 2013/9339* (2013.01); *G01S 2013/9353* (2013.01); *G01S 2013/9357* (2013.01); *G01S 2013/9375* (2013.01); *G01S 2013/9378* (2013.01); *G01S 2013/9382* (2013.01); *G01S 2013/9385* (2013.01)

(58) Field of Classification Search
CPC ....... G01S 13/04; G01S 13/867; G01S 13/87; G01S 13/931; G01S 2013/9353; G01S 2013/9378; G01S 2013/9385; G01S 2013/9357; G01S 2013/9339; G01S 2013/9382; G01S 2013/9375; G01S 13/9303; G01S 13/9307
USPC .............................. 342/52–55, 70–72, 95–97
See application file for complete search history.

(56) References Cited

U.S. PATENT DOCUMENTS

| | | | |
|---|---|---|---|
| 3,971,018 A * | 7/1976 | Isbister et al. .................. | 342/41 |
| 5,045,856 A | 9/1991 | Paoletti | |
| 5,134,409 A * | 7/1992 | De Groot ........................ | 342/52 |
| 5,517,197 A | 5/1996 | Algeo et al. | |
| 6,903,676 B1 * | 6/2005 | Frady et al. ..................... | 342/52 |
| 7,040,570 B2 * | 5/2006 | Sims et al. ................... | 244/3.16 |
| 7,551,121 B1 * | 6/2009 | O'Connell et al. ............. | 342/54 |
| 8,102,306 B2 * | 1/2012 | Smith et al. .................... | 342/52 |

(Continued)

FOREIGN PATENT DOCUMENTS

WO 2009/019191 A1 2/2009

*Primary Examiner* — John B Sotomayor
(74) *Attorney, Agent, or Firm* — Lucas & Mercanti, LLP (57) ABSTRACT

Surveillance system for detecting the position, movement, nature of one or more objects and even communicate with it, that is adaptive to any extent and suitable for any mobile or fixed structure and even for persons, because of its flexible open architecture, which is fully modular to develop self-contained compact radar devices of special performances when working either autonomously, like conventional video-cameras nevertheless operating also with microwaves and therefore called microwave-cameras or radar-cameras, or jointly to form more complex interactive systems.

15 Claims, 5 Drawing Sheets

(56) References Cited

U.S. PATENT DOCUMENTS

2005/0134440 A1* 6/2005 Breed ........................... 340/435
2005/0146458 A1* 7/2005 Carmichael et al. ............ 342/52
2006/0197699 A1 9/2006 Cornic
2007/0146195 A1* 6/2007 Wallenberg et al. ............ 342/52
2007/0182528 A1* 8/2007 Breed et al. ................... 340/435

* cited by examiner

SURVEILLANCE SYSTEM WITH RADIO-WAVE CAMERA

CROSS-REFERENCE TO RELATED APPLICATIONS

This application is a 371 of PCT/EP2011/055024, filed Mar. 31, 2011, which claims the benefit of Italian Patent Application No. RM2010A000152, field Apr. 1, 2010, the contents of each of which are incorporated herein by reference.

FIELD OF THE INVENTION

The invention refers to ecological radar devices to precisely detect objects in any weather condition and zero visibility, suitable to form surveillance and safety systems adaptive to any extent and to any mobile or fixed structures, such as vehicles, roads, rails, tunnels, canals, platforms, buildings, harbours, airports, and even to persons.

BACKGROUND OF THE INVENTION

There are many "critical infrastructures", such as those destined to transportation, which demand surveillance and protection and for which plenty of measures have been deployed, essentially based on video-surveillance by means of electro-optical sensors such as daylight video cameras and night vision infrared cameras. Unfortunately all these sensors become useless in case of thick fog, heavy rain, dense smog and similar prohibitive factors, because the particles in air suspension disperse the light rays, also the infra-red ones.

Then to explore such invisible scenarios only microwaves can be used, and radars are the best known solution. They are complex transmitter-receiver devices, irradiating electromagnetic power into a large frequency band; for this reason unfortunately they are considerable sources of electromagnetic noise, at the point that more identical radars cannot work together without disturbing each other, unless they be distant enough or used distant frequency bands: the availability of which is limited anyway, and therefore is limited also the number of identical radars let working together in a same area. This means that existing radars cannot be deployed independently at will as it happens for cited video cameras.

The first aim of the invention is to disclose a plurality of radars that can be deployed at will, as allowed with ordinary video cameras, without problems of interference or disturbances. This result introduces a new family of sensors, that we may call "microwave cameras" or "radar cameras", in analogy with the common video cameras for the easy application everywhere at will, nevertheless distinctive for exploring also invisible scenarios in bad weather even with zero visibility.

The second aim of the invention is to become a complete surveillance system, which is truly "distributed", "adaptive" and "all weather", using combinations of "video cameras" and "microwave cameras" as before specified realizing multispectral compact devices, suitable to be deployed at will in multiple configurations, without interference problems and without limitations about their number, coverage, geometry, extension and application.

Hence the invention overcomes all similar solutions of the past, by introducing a scalable monitoring system able to detect both nearby and distant objects, measure their position and provide intelligent data elaboration, by means of small compact devices easily applicable at will to structures of any geometry and size. In fact the whole system can be broken down into self-contained parts suitable for any installation, since comprising a radar system that can be decomposed at will. The detachment handles the volatile nature of microwave radar signals and their complex control, satisfying the triple condition that said self-contained parts work autonomously wherever, are integrated like a whole and perform correlation in "real time": what is comparable to "move the biological ears" from a head long away and however maintain their functionality with the rest of the body.

In practice this feature discloses a new type of "distributed adaptive radar" having the original capability of expanding at will, to survey areas of any geometry, shape and extension, for both fixed and mobile structures of any size and number, in order to satisfy several applications previously unimagined, as explained below.

Such a non-conventional architecture comes out from specific properties of composition, decomposition and adaptiveness, not included in any of prior art documents.

Hence the invention represents a significant evolution in the specific technique of the same field and with respect to the other patents, also by the same inventor, such as the IT 1222297, IT 1277302, U.S. Pat. No. 5,045,856, EU 396 611. In fact any traditional radar is meant like a stand alone "monolithic" equipment, performing a limited and centralized coverage by means of the classical scanning antenna, without the capacity of spatial decomposition and composition as introduced by the invention. Due to this capacity, instead, the invention performs a de-centralized coverage, potentially unlimited, from many points of view, then "distributed" and "adaptive" for any structure, platform and application.

In other words, a conventional "monolithic" radar system now becomes, according to the invention, split in a "plurality" of smaller radars: each one operating either autonomously or jointly, each one being not cumbersome, not heavy, not showy and therefore suitable to be installed and hidden and scattered and spread at will along extended fixed structures, roads, bridges, channels, rails, tunnels et cetera, for any type of surveillance and relevance on land, sea or air, along lines, surfaces and volumes of all kinds and shapes; and also can be installed on moving structures, vehicles, trains, boats, aircraft et cetera for anti-collision purposes, safe driving, inspections at a distance, ground investigations, info-mobility; and can also become portable and even wearable.

All this variety of applications is of course impossible with conventional stand alone radars, which are all "monolithic" devices even if internally made up by modules or mini-radars performing elementary functions, because such modules stay all together inside the same assembly and are synchronized all at once, and therefore they are not independent, not self contained, not autonomous, not suitable to be "distributed" at will over long distances.

For instance, the patent US2006/197699 mentions transmitting and receiving modules which are the front-end parts of an active electronically scanned antenna; all said modules share a common local oscillator and also a reference clock that synchronizes them, to the purpose of adding up their elementary contributions all at once to produce a greater one, that is the one pertaining to one antenna device, suitable for one radar apparatus, which consequently results like a conventional "monolithic" apparatus, stand alone, clearly unable to satisfy applications spatially "distributed" and "adaptive" as those attended by the invention.

Also WO 2009/019191 deals with a modular radar system composed by a plurality of mini-radars which, as before, are synchronized by a centralized unit through a common clock signal; being obvious that each one module creates its own radar independent pathway and that the synchronization of the modules drives them all at once so as to finally appear like a single electronically scanned antenna; of course such antenna may be a part of a radar, and vice versa this one may include said modules; therefore such a radar globally turns out to be a "monolithic" apparatus again, being not a "distributed" apparatus according to the present invention, which is based on a different architecture with parts capable to operate autonomously, separated also by long distances, without a common synchronization.

U.S. Pat. No. 5,517,197 considers the modular architecture of a radar provided with a transmitting receiving antenna, that is again a "monolithic" apparatus, without any possibility of decomposition or combination with other similar devices in order to constitute a "distributed" and "adaptive" radar system like the invention.

For the rest, there is a substantial difference with all the innumerable patents simply adding a traditional video camera with a traditional radar or microwave sensor, since the present invention is based on the non-conventional architecture here disclosed with specific properties of composition, decomposition and adaptiveness.

BRIEF DESCRIPTION OF THE DRAWINGS

The invention can be used as a single sensor, or more extensively as a variety of integrated sensors, according to custom configuration requirements. It is described below with the help of the following figures, for illustrative and not limited purposes.

FIG. 1—Schematic representation of the system and its basic units.

FIG. 2—System configurations for mobile applications on ground, sea, air vehicles.

FIG. 3—Multimedia interfaces with the user.

FIG. 4—System configurations for fixed and special applications.

FIG. 5—Sensor configurations of the system.

DESCRIPTION OF THE INVENTION

The present invention, being able to assume any attitude, is extremely versatile, easy to use and low cost, valid to satisfy a wide variety of applications still uncovered. It falls within the substantive scope of human needs and in the technical field of electronic equipment manufacturing. As mentioned, it includes a distributed radar that integrates other elements, depending on the use and the degree of protection desired. This radar can also be represented by the following mathematical formula $$u(t) = r(t) \cdot m(t) = A_2 \cdot \cos(\varphi_2 + 2\pi f_2 t) \cdot$$
$$A_1 \cdot \cos(2\pi f_1 t + \varphi_1) =$$
$$= A \cdot \cos[2\pi(f_1 + f_2)t + (\varphi_1 + \varphi_2)] +$$
$$A \cdot \cos[2\pi(f_2 - f_1)t] + (\varphi_2 - \varphi_1)]$$

and its possible modification, adaptation and combinations for a plurality of concurring devices, bearing in mind that the most significant aspect of the invention lies in the fact that it is adaptive and adaptable to the needs of security, increasingly felt by the modern society for all sorts of activities and especially in transportation.

The invention is disclosed in the appended claims and following description.

Figure 1A:
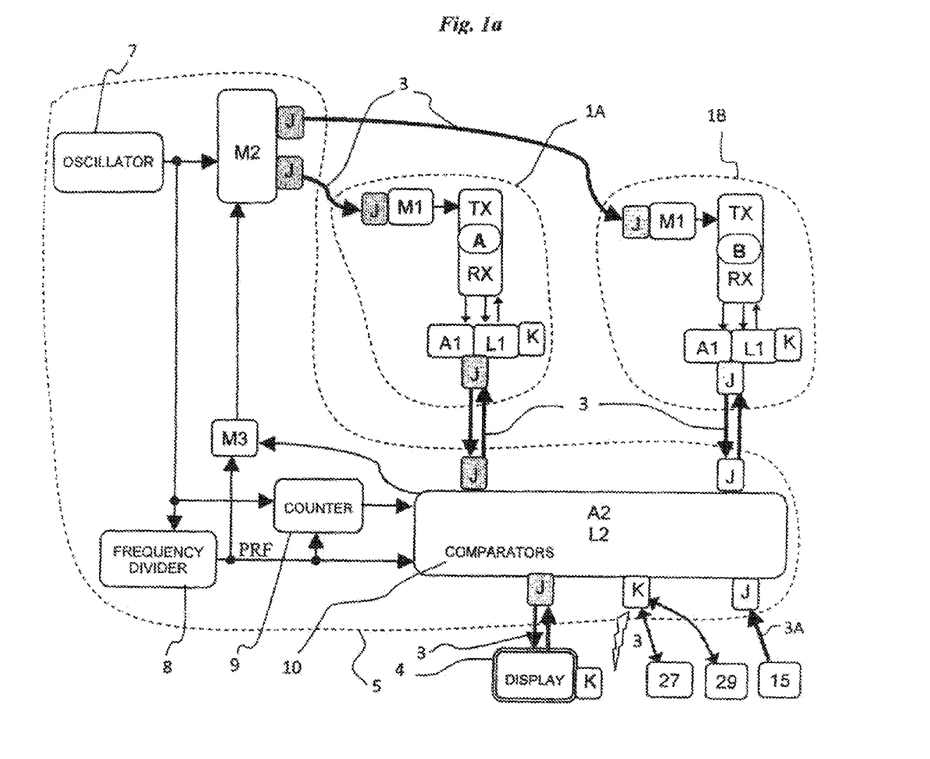

In detail, FIG. 1a shows the structure of the system, comprising antennas A, B connected to transmitting circuits TX and receiving circuits RX combined with other circuits up to the viewer presentation 4. More precisely, some of those well known circuits, namely having functions of modulators, amplifiers and logics, are now cut into portions—M1, M2, A1, A2, L1, L2—and are integrated with other elements, according to the technical scheme detailed by this figure. An expert of the field can understand that the typical modulator functions can be accomplished as well even if the modulator circuit results from the portions M1 and M2 jointed together by interface circuits J and connection means 3, and the same goes for the amplifiers in the cut portions A1 and A2, and also for the logic circuits in the cut portions L1 and L2, through a proper design. Such a design draws advantage from a "metalogical dissection technique", which means that the circuit dissection keeps up the electronic signal information from the beginning up to a very distant end, while travelling "in real time" through logical, analogical and digital technologies where particular behaviours allow spatial separation without information degradation—for instance, the information carried by weak analogical signals entering into the amplifiers, which in the block A1 may be low noise amplifiers, followed in the block A2 by high gain or digital amplifiers, can be recovered at the final output of these ones, notwithstanding A1 and A2 be separated by a long distance.

The aforesaid is, in fact, the first step to disclose the specific architecture of the invention, where the above functional parts are rearranged and renamed as follows:

Radar Cameras 1A, 1B including microwave antennas A, B connected to both the transmission circuits TX associated with portions of circuits modulators M1 and to the receiver circuits RX associated with portions of the amplifier circuits A1 and logic circuits L1, with interface elements J and complementary elements K to exchange data and electrical parameters with the outside;

Elaborator 5, comprising the remaining portions of modulator circuits M2 and amplifier circuits A2 and logic circuits L2 in association with already known oscillator circuits 7, divider 8, counter 9 and comparator 10, adding interface elements J and complementary elements K for exchanging data, signals and values with the outside;

Display 4, having the task of showing off the information processed by the Elaborator 5, and more generally the function of ergonomic man-machine interface, providing the user with multimedia data and commands and settings also for the system management;

Connection means 3 to link together the above said parts, including cables or optical fibres or else more sophisticated radio link devices or other communication means;

Mechanical means as needed to embody the above said parts like either a compact unit or many detachable units, being supported by specific fixtures 6 for the physical setting in the befitting positions according to applications.

The second step deals with the operation of such a solution, since the above said functional parts—into which the system can split—can be multiplied at will, can be distanced at will, can be combined at will, and still form an integrated complexion with no degradation of performances, despite the physical limitations and constraints imposed by the technological complexity and the high speed of the radio signals involved.

Really this capacity lacks in conventional radar technology; in fact, as remembered before, known radars are basically "monolithic" systems, in the sense they implement individual coverages using single antenna scanning. This is true also for the so called bi-static radar using two or more antennas that, however, work individually like either a transmitter or a receiver, or anyway coupled using different radio frequency bands. Instead the present invention uses multiple antennas transmitting and receiving at the same time and on the same frequency band, besides assuring proper relationships among radio signals having instantaneous and very changing connotations while managing them from a plurality of radar devices scattered at will, thus implementing true "distributed" radar systems and moreover "adaptive" for many diverse geometries and applications.

To reach this goal in practice, the invention needs to further disclose and harmonize more specific techniques, as explained in the following. Each antenna, along with its attached circuits, performs both the transmission of specific microwaves and the reception of the consequent echoes reflected back by the intercepted objects: in this sense, we can imagine each antenna like an elementary sensor operating on the radar principle. Each sensor like this can work even in the presence of other identical ones, without suffering mutual undesirable interferences, because of the specific formulation herewith referred, which is a great success in harmonizing this specific "metalogical dissection technique" together with the "pulse frequency modulation technique" and the "amplitude discrimination technique" already known. As a first consequence, a plurality of identical "Radar Cameras" 1A, 1B can be scattered at will and nevertheless work integrated all together, thus implementing the concept of a "true modular" system which can have architecture and structure "expandable" to spaces of any size and geometry, "adaptive" with total flexibility to overcome all difficulties of installation and employment. To better realize this powerful concept, at the beginning let us consider a road vehicle, where there are great issues of aesthetics, functionality and safety.

Figure 2A:
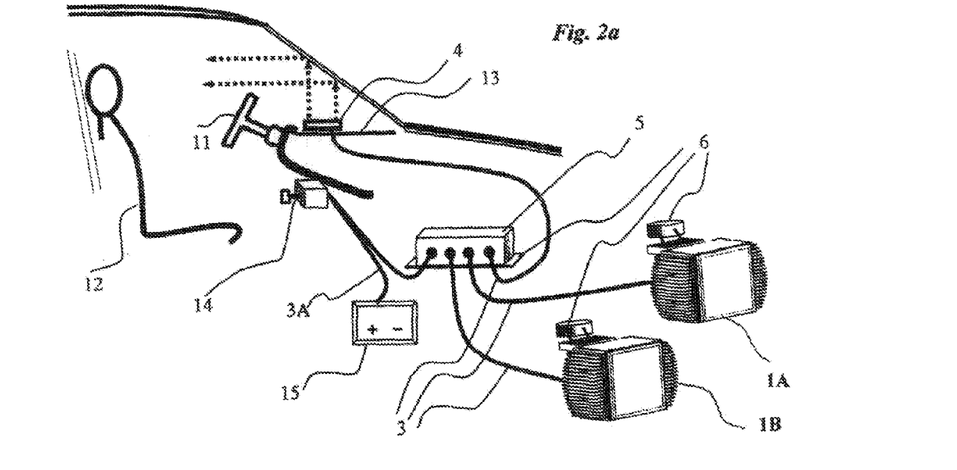

FIG. 2a explains how these three problems are all together solved by the invention. In fact the functional modules mentioned above: Radar Cameras 1A and 1B, Cables 3, Display 4, Elaborator 5, Supports 6, are clearly identified and specialized, and therefore they are characteristic of the system. They operate integrately and are also individually optimized, because each of them is small enough to precisely stay in the right place to work at the best performances. In detail: the Radar Cameras 1A and 1B are fixed preferably on the front of the vehicle, just like ordinary anti-fog lights, and they essentially transmit and receive microwaves; the remaining functions of the system are carried out by the Elaborator 5, placed in another available space inside the vehicle; finally the Display 4 is placed beyond the steering wheel 11 of the driver 12, onto the dashboard 13 or even incorporated into the windscreen—with a specific technology—to be comfortable for direct vision or else for indirect vision by reflection or projection "head-up".

According to FIG. 1a and FIG. 2a, the operation of the system becomes the following. The Radar Cameras 1A, 1B emit and receive microwave using own TX and RX circuits connected to the antennas A, B of mechanical type, horn shaped, parabola or otherwise, or of electronic type, with micro strips, in case including lenses, reflectors and directors with manual or mechanized drivers; each of these circuits TX is driven by a circuit M1 acting as a "local modulator", in turn driven by another circuit called "master modulator" M2 located into the Elaborator 5; the circuits RX are next the amplifier circuits A1, in turn connected to the "master amplifier" circuits A2 also placed in the Elaborator 5, which then controls the gain, bandwidth and other parameters useful to optimize the amplification; besides the Radar Cameras comprise "logical" circuits L1 performing local functions—such as electrical and thermal stabilization, intelligent management of operative parameters, processing and storage of selected data, A/D and D/A conversion, integration on request of complementary circuits and devices K of any type, such as electro-optical, electro-acoustic, electro-thermal, electro-mechanical et cetera—and also elements of interface J for the connection means 3. Finally the Elaborator 5 includes other known key parts—oscillators 7, dividers 8, counters 9 and comparators 10—together with own "logical" circuits L2 and complementary devices K and interface elements J used to exchange signals and commands with the Display 4 and therefore with the user by intelligent and interactive expedients, as pointed out later.

Such a modular architecture yields the several benefits listed below.

Breakdown of the aesthetic and physical impact of the system, in order to make it easily applicable everywhere with high versatility and "adaptive" performances; in fact the functional modules 1, 3, 4, 5, 6 have specialized tasks, have individual compactness to stay in the best suitable places for them, are easy to assemble, calibrate and test, and in case of failure each module can be quickly identified and replaced, reducing time and cost for repairing, so that the system is within everybody's reach and can be used also by non technically specialized people.

Compatibility with the stylistic symmetry of vehicles, where normally lights and optical groups are marked as left and right, and therefore also the Radar Cameras 1 can be manufactured as left and right and then respond to any cogency of aesthetics.

Availability of distinctive "optionals" for vehicles new or not, retrofit and after-market, because especially Radar Cameras 1, Display 4 and Fixture 6 can be customized at will to fit up both the inside and the outside, taking into account that the new Radar Cameras may represent a unique compact solution also including electro-acoustic and electro-optic complementary circuits K, the first ones for example helping short-range detections for parking manoeuvres, the second ones enabling additional visual information like telecameras or else simply decorative effects like electroluminescent elements.

Possibility of hiding the system, making Radar Camera frontal side of camouflage material, transparent to electromagnetic radiation and having the identical appearance of the surrounding parts of the vehicle.

Instantaneous "real time" detection and signaling of steady or moving objects in the area covered by the Radar Cameras, because these ones explore the scenario along different directions simultaneously and continuously, without waiting the times required by conventional radar scanning antennas.

Devices built in solid state technology, perfect for robustness and absence of moving mechanisms, that means absence of vibration, noise and wear, to operate with highest reliability in complete silence.

Interchanging and reallocation of the system from one vehicle to another, disassembling and reassembling the characteristic functional modules all together or partially; cables and supports can be predisposed, and later on the other modules can be just added on request.

Industrial and economic expedience, because each part of the system can change independently of the others, and the same mass production can serve very different vehicle models and customizations by just changing only some parts, such as Supports 6 or Display 4 to suit vehicle furnishing and constraints or to meet specific requirements.

Numberless configurations—open, scalable, expandable—can be prepared with only very few types of parts, optimizing setting up and logistics in terms of inventory, spares and repairs. For example, in the case of special vehicles, are eligible configurations with one, two or more Radar Cameras to be placed not only on the front but also on the rear and on the sides: up to create a multi-directional integrated mobile surveillance system, even omnidirectional. Vehicles so equipped can move in formation, and their individual radar detections can be communicated via radio each other and be composed onto panoramic displays, representing in "real time" a wider knowledge of the effective scenario. This "system of systems" is able to identify each one of the cooperating Radar Cameras in the respective position, by means of the complementary circuits K exploiting information technologies to integrate functions pertaining to GPS receivers and telecommunication equipment, thus exchanging codes of position and of recognition with shared methods and protocols well known.

Security against theft and fraud, because the attackers are discouraged knowing that system modules are located in different places of the vehicle and that illegal removal makes them unusable: in fact Radar Cameras 1, Elaborator 5 and Display 4 exchange data encoded according to a protocol, that is to say, according to a special "electronic key", that disables the module itself if its correspondence with the rest of the system, in accordance with that predetermined key, is missed. The electronic key can reside in the logic circuits L1 and L2.

A special "recovery key" is foreseen to recondition or repair the faulty modules by authorized technicians. This recovery key has also a second function: to let authorized technicians know the "story" of the system and its past detections, reading data that are automatically registered in nonvolatile memory chips belonging to the logic circuits L1 and L2; therefore the system modules can also perform the functions of "black boxes", similar to those onboard airplanes, to help investigators track down any useful information to reconstruct the dynamics of unpleasant facts.

In addition, according to the invention, the complementary circuits K may activate a transmitter such as GSM in order to dial phone numbers, especially in case the system sensors in an intelligent way recognize the occurrence of a critical situation, such as an accident, and therefore automatically start, on behalf of the injured passengers, emergency calls with voice or text message or location data or images of the event, detected by sensors and recorded in chips as described above.

Another aspect shown in FIG. 2a includes a mechanical switch key 14, preferably along the power supply line 3A coming from the battery 15, to be used by authorized persons to select system power on and power off, and in case more different operating modes, such as: greater or lesser range of the radar, "short, medium, long-range", quality of detections, "low or high definition", electricity saving "stand-by"; with the benefit of making the system more versatile and adaptable to different practical situations. Said key 14 may have a multifunctional connection to the Elaborator 5 through a linking cable. This key may be also included in complementary circuits K based on magnetic recognition, optical badges and so on. Or it may simply stay by the Display 4 and consist of one or more buttons 17 to push in sequence or combination, or else a knob, as in FIG. 3a, 3b, 3c.

Such a Display 4, according to the invention, is multimedia, interactive and practical to use, disclosing a specific ergonomic design conceived for a vehicle driver who is also a radar operator at the same time. In fact the Display delivered information is highly efficient, for the instant accurate effect through the senses of sight and hearing, with images readily understandable to the corner of one's eye without distracting the attention off the road; and information is also effective to indicate a potential danger in order to avoid it: especially at night, when the normal headlights illuminate the road within a range of about thirty, forty meters, the invention allows to "see" much farther; and when the subjective perception of the road fades due to sudden natural factors—fog—or accidental ones—smoke—or physiological ones—sleep—the driver is immediately alerted to safely manoeuvre and prevent tragic collisions—unlike the air-bag which occurs after the collision has occurred.

Figure 3A:
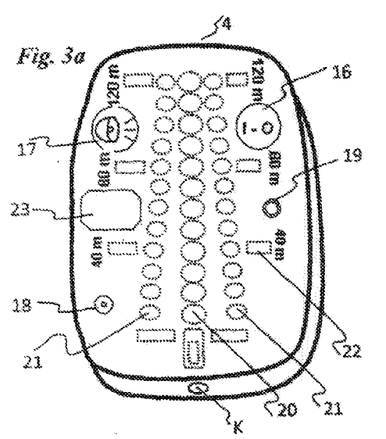

FIG. 3a outlines a first preferred design of this Display 4. The button 16 turns on and off the system, the button 17 enables or not the beeper 18 included for warnings and voice comments, the electro-optical sensor 19 dimmers the presentation brightness depending on the ambient light. The driver can see a synthetic map representing the area in front of the vehicle by means of luminous spots; each spot represents a limited area, for example, ten meters long; then a row of twelve spots corresponds to a pathway one hundred and twenty meters long, and three adjacent rows represent three contiguous pathways—left, centre, right—that sum up the scene of the road ahead. Each spot changes colour or brightness to indicate whether an obstacle is present or not in the corresponding road area, which may be of constant extension for all the spots, or else not, for instance logarithmic. Preferably the spots are differentiated in shapes and colours to improve meaning and attention: for example those of the central row 20 are larger and louder; the side rows 21 are convergent so as to inspire a sense of perspective; besides there are graduated rows and reference spots 22 and service indicators 23 for messages, diagnostics, settings, alarms and so on.

Figure 3B:
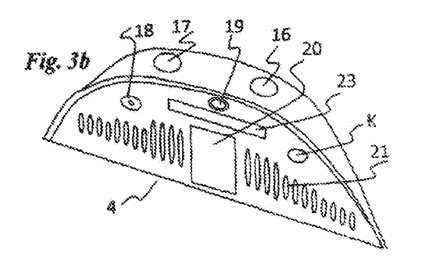

FIG. 3b outlines an alternative Display 4, wider and shorter to better fit the contours of the dashboard. The above-mentioned side rows 21 are arranged horizontally, while the central one is replaced by the frame 20 that uses symbols to indicate the free space ahead. The luminous spots can exploit technologies of LED, OLED, LCD, holography, electroluminescent fibres, plaques, membranes, also interchangeable, with forms, designs and colours for any customizations. Controls and buttons can be smooth on a membrane, or sticking out, to be pushed, touched, rotated, in case fitted out with own luminous or audio warnings; and at least one of them is multifunctional for various settings. For example, a brief pressure on the button 17 enables or disables the mentioned beeper 18, but a repeated longer pressure enables different presentation modes, such as a "raw" presentation—where a detected obstacle lights up only the spot corresponding to its position—or an "enriched" presentation—where in addition also the spots corresponding to larger distances beyond it light up: thus stirring up a greater visual impact, while keeping the exact distinction between the free zone and the unavailable one, as evidenced by the spots of the Display 4 in the FIG. 3c.

For special vehicles or for disabled people there is also a voice command or remote control. The first uses a microphone cap close to the driver, even inside the Display 4, connected to intelligent complementary circuits K interpreting the speech signal. The second uses ordinary tele-connected devices—optical, sonic, radio links—placed both at driver's disposal and in the system complimentary circuitry K.

These complimentary circuits K, as provided with telecommunication capabilities and being present not only in the Elaborator 5 but also in the Radar Cameras 1 and the Display 4, are also suitable to eliminate unwanted connecting cables; they even allow to eliminate the Display itself, by replacing it with an interactive device commonly used, such as a cellular mobile phone, sharing its screen, buttons, speakers and radio circuits, the last ones linked via radio with said complimentary circuits K acting like transceivers.

In fact the complimentary circuits K are meant depending on the application. They can have the task of settling connections—also wireless—with external devices, in particular with the vehicle electronics, to let the invention exchange data with the board computer and then process combined information. It is possible for instance to relate the safety distance measured by the Radar Cameras with the vehicle speed measured by the speedometer, or with the position measured by a GPS receiver already existing onboard. Its worthy to be highlighted that a GPS indicates the position of the vehicle and the road to follow, but does not indicate if the way is free, because it does not "see" the road; instead, the Radar Cameras see and analyze it always.

The invention further allows the creation of a "real-time network" with plurality of individual radar systems, where more Elaborator modules telecommunicate among themselves and with other external devices, such as transponders along transport routes, satisfying modern info-mobility intelligent applications.

Definitively, having a modular architecture even at radar level, the invention is able to adapt itself on vehicles of any type and size, especially for the purpose of accident prevention, with special regard to categories of workers that must travel always, even in difficult and prohibitive conditions, such as ambulances, emergency and delivery services, escort, patrol, civilian protection, defence.

Figure 2B:
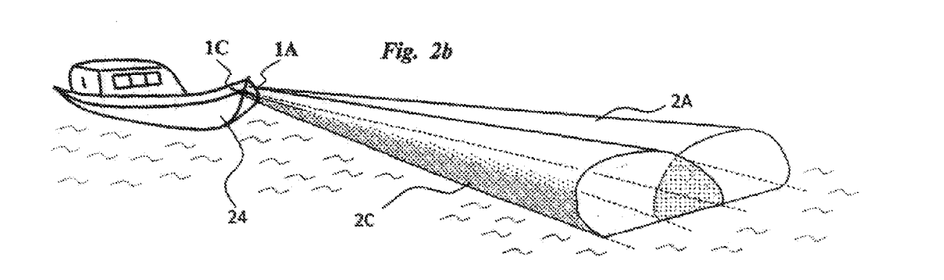

FIG. 2b shows a vessel 24 equipped on the bow with some Radar Cameras 1A, 1C emitting beams 2A, 2C and as before operating jointly with the Elaborator and the Display inside.

Figure 3C:
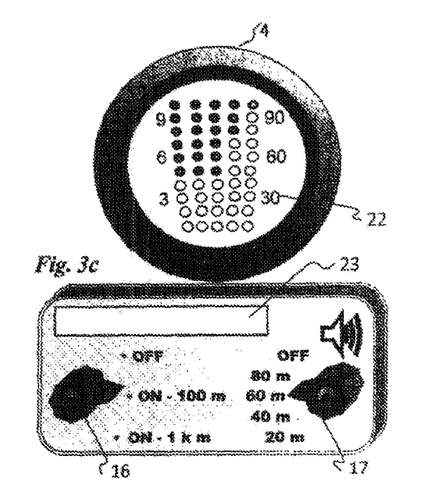
Figure 3D:
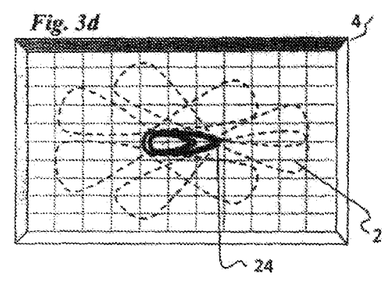

FIG. 3d depicts a panoramic wide screen Display, that, according to the invention, can represent the outline of the hull 24 surrounded by the sea surface that is surveilled by means of Radar Cameras, arranged not only forward but also in the stern and along the sides: that is perimetrically and with the beams 2 oriented all around.

Figure 2C:
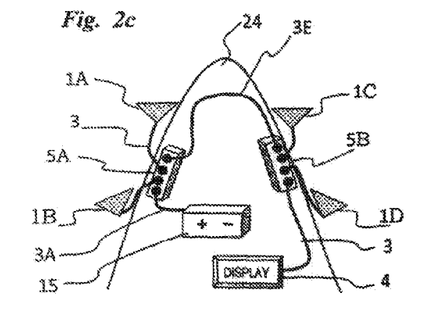

FIG. 2c discloses the connection scheme to integrate many Radar Cameras 1A, 1B, 1C, 1D with many Elaborators 5A, 5B up to the Display 4. This is clearly an expanded configuration of the technical scheme outlined above, featuring the following benefits not present in the conventional radar systems.

Creation of the safety belt around the vessel: useful not only in port for manoeuvring and mooring, but also to navigate in narrow waters: rivers, canals, lagoons, and also in open sea: during towing, turns, transhipments. They are all cases needing the constant check of the distances: an operation that till now is done "at sight", while the invention arranged like a "perimetrical radar" eliminates the errors due to human factors and therefore enhances the safety of people and things.

Proximity surveillance around the vessel, also for anti-intrusion purpose, by exploring areas where conventional radars do not see. In fact these ones, to explore afar, have the scanning antenna high on the mast, thus leaving below a blind zone just where there are the hull and surroundings. Instead the Radar Cameras stay below and look into the blind area.

Effectiveness in detecting small objects, since the Radar Cameras staying below explore with an horizontal view "sliding over" the water, that is very different from the perspective "from the top" of the classical radar antenna, which intercepts the sea waves and therefore is penalised by the "clutter" of plenty unwanted radar echoes.

Distinctive mark of the vessel, because Radar Cameras are suitable for visible and elegant applications, mounted on the broadsides, or otherwise concealed by camouflage surfaces.

Tailored solution, easily applicable and removable, open and scalable, since more or less Radar Cameras and attached devices can be displaced and customized according to the vessel type and the desired degree of coverage and safety.

For these reasons, the invention is meant complementary to the existing systems for large ships, while for small boats and motorboats, where the classic rotating radar antennas hardly could find a place, it may be essential to a safer navigation.

FIG. 3c shows a simple boat Display 4, conceived round as a bridge instrument and furnished with two controls: the first one 16 turns on the system and selects the radar range—for example, up to a hundred meters to explore in the vicinity, or multiplying by ten, up to a kilometer—while the second knob 17 sets auxiliary functions, such as the guard-distance under which an oncoming object starts a warning. Similar to the Display in FIG. 3a, the size, shape, presentation, housing—fixed or portable—can be changed at will, and include functions such as: setting and commands—input—through voice "vocal control" or pressure "touch screen", delivery—output—of warnings and messages, tracking and identification of objects, settings for surveillance, early warning, recordings, transmissions, testing, simulations etcetera. To comply with these ordinary functions of command and control that are typical of an Operative Center, the invention makes use of the before said complimentary circuits K in a very advantageous way, since these have the immediate capability to link and cooperate, as necessary, with several computerized units, video cameras, GPS receivers, electronic maps, transponders etcetera, preferably in accordance with standard LAN, Ethernet, GMDSS, EPIRB, Navtex, Canbus, Bluetooth.

Figure 3E:
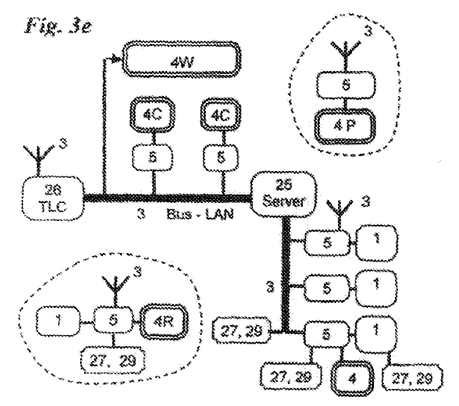

FIG. 3e illustrates and extends this important concept by showing a wider complex architecture of the invention with modules that are located in various places and form various subsystems, which are locally autonomous but cooperating as well. The mixed configuration of this example points out several Displays 4, one of which is panoramic 4W, and others 4C are referred to service consoles, variously connected with Radar Cameras 1, Elaborators 5, computer and server nodes 25, communication and TLC nodes 26, et cetera, by means of connections 3 formed by bus, electrical cables, optical fibers or radio links: these ones intended for portable Displays 4P assigned to mobile workers, and as well to connect other locations with remote Displays 4R or ancillary elements 27 such as hooters, flashing lights, cooperating systems.

Figure 2D:
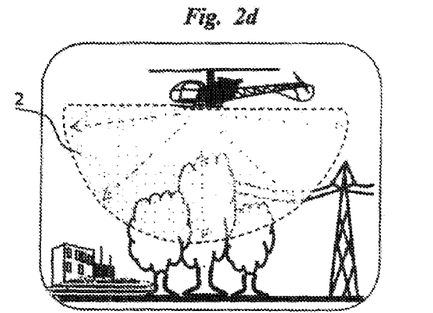

FIG. 2d shifts the focus on safety for avionic vehicles. Trees, electricity pylons and overhead lines are deadly hazards for helicopters, especially when there is fog, rain and obscurity. The invention makes it possible to monitor an entire hemisphere in front, aside and below the aircraft, providing its fuselage with Radar Cameras having the antennas in an "insect eye" arrangement, designed to articulate a plurality of radar beams along many different directions. Performances of "obstacle avoidance" are then achieved, because of such effective 3D three-dimensional coverage, which continuously measures the safe space of flight and makes the pilot aware of the dangerous obstacles around even in sudden zero visibility conditions due to fast clouds or smoke.

Beyond the mobile platforms, previously regarded by example, also the fixed structures can employ the invention to monitor and control sensitive areas.

Figure 4A:
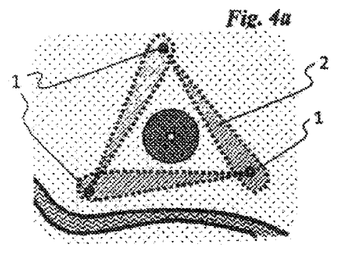

FIG. 4a shows the "surveillance of point", meant as building, pylori, gate, yard, camp et cetera, by means of Radar Cameras 1 that generate a belt of radar beams 2, by which they moreover look after each other reciprocally. Since each Radar Camera 1 includes both a radar transmitter and a receiver, this technical approach is completely different from the other 'state of the art' security systems called microwave barriers that separately install a transmitter at one side of a length and a receiver on the opposite side.

Figures 4B, 4C:
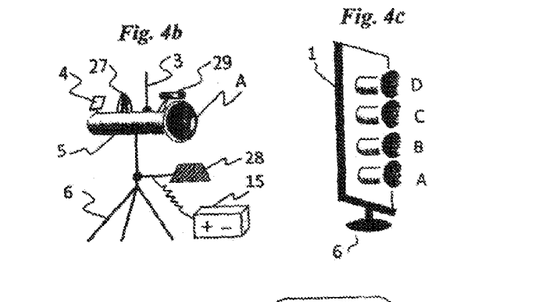

FIG. 4b outlines a practical compact configuration for the field use, where the tripod 6 supports a Radar Camera embedding antenna A, retractile Display 4, Elaborator 5, radio link connection 3, electrical battery 15, indicator 27, photovoltaic panel 28, video camera 29. Obviously this configuration is susceptible to change for a variety of applications aimed to monitor presence, position, speed, size, nature of distant objects in any weather. One example relates to the automatic toll devices, being the invention able to detect the passage of vehicles and identify them individually, by means of Radar Cameras provided with complimentary circuits K adding video cameras 29 or transponders, "RFID", "Telepass" type. In a similar way, also the check of vehicles entering into restricted traffic areas can be accomplished. Another example concerns intelligent traffic-lights, which can be equipped with devices according to the invention in order to measure the queues and consequently manage the "alt" or "go" signals.

FIG. 4c shows a Radar Camera with multiple antennas A, B, C, D generating composite radar beams to control gates and passages, inspect remote objects and persons, including "body scanning". The relative images on the display result composed by stripes, like in FIG. 3f. Advanced techniques can be employed by the annexed Elaborator 5 for differential analysis to enhance detection data interpretation, for more sophisticated graphic rendering, for achieving performances of synthetic aperture antenna radar "SAR" of either direct or inverse type to get very accurate and detailed "radar images" of moving objects, such as, for example, people dragged along an escalator and checked at a distance. But also the whole system of antennas A, B, C, D can be put in motion, for example because carried by a drone, or just because the support 6 rotates and within the displacement measured by a collimator "encoder" also multiple scannings are performed in several points, distant and near, up to even inspect objects hidden under clothing. The very low microwave power is totally harmless to people—in contrast to other methods such as those based on X-rays.

Figure 4D:
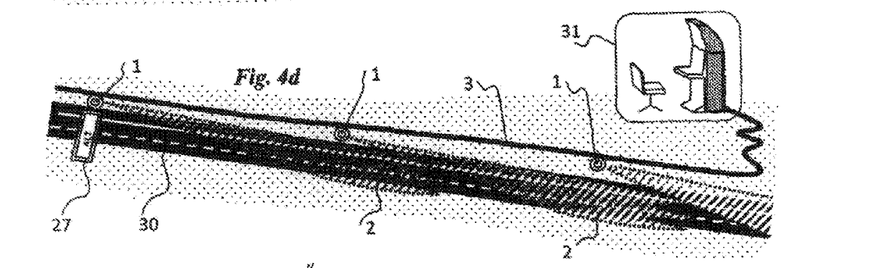

FIG. 4d shows the "surveillance of lines", which can meander and branch off on land and water routes—roads, trails, railways, canals, rivers, coastlines, walls, fences, borders—also very long and narrow, by versants or slopes and even into galleries: all applications that the "monolithic" conventional radar cannot meet at all; while Radar Cameras 1 applied along a road 30 check the regular traffic flow, transmit relevant data to the Operative Centre 31 and issue warnings and alerts also on the road, with electro-acoustic or electro-optic devices 27 in the guise of traffic lights or poles, also with radio transmission such as "zig-bee", GSM and "broad-casting", using the complementary circuits K mentioned above. The result is threefold:

continuous radar monitoring "in all weather conditions and visibility";
immediate assessment of danger, in "real time";
warning of the danger directly "on site", along the road before.

Such a combination allows to prevent, to avoid "in the bud" the risk of catastrophic accidents: and this for travelers means safety of priceless social value. Episodes of driving against traffic, loss of transported loads, road debris, turnovers of vehicles due to illness or risky manoeuvres, can be immediately warned in order to stop on time the oncoming drivers. The Radar Cameras use microwaves that are never degraded under stress of weather, and hence are always valid: mostly in situations of greater need due to dark, smoke, fog, rain, blizzards, dust storms and so on. Data collected on positions and velocities of the passing vehicles allow intelligent programs within the system to highlight abnormal situations.

Figures 5A, 5B, 5C, 5D, 5E, 5F, 5G, 5H, 5I, 5J, 5K, 5L:
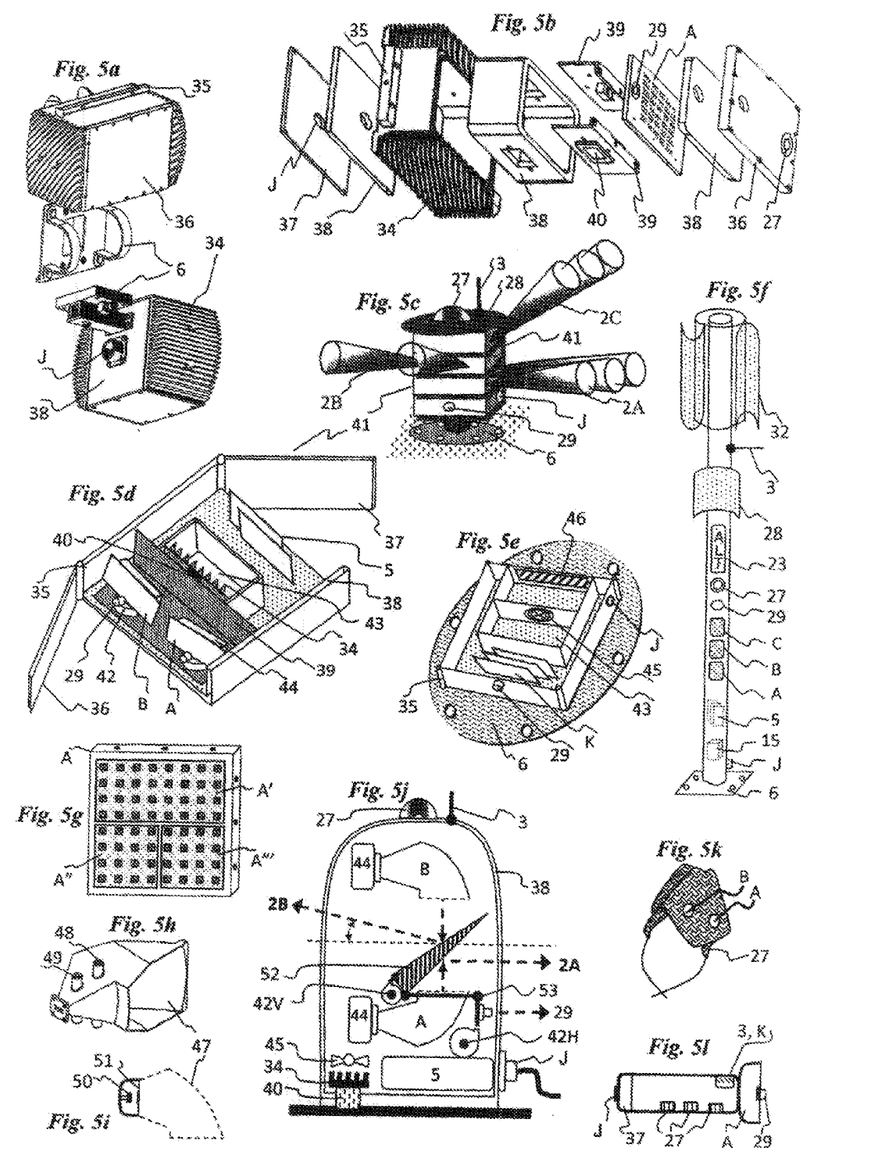

FIG. 5f illustrates this application through a multi-functional post with radar antennas A, B, C and electro-optical sensors 29 to directly observe the local situation, including light or acoustic warning 27 and variable message display 23, photovoltaic panel 28, electric battery 15, antenna 3 for radio connections also with other similar posts, up to the Operative Centre 31; in addition the top 32 of the post captures wind power by blades connected to an electricity generator. The invention therefore demonstrates itself adaptive to structures of all kinds to better set out them, in this case making the post a twice ecological generator, since produces both security and clean energy together.

Figures 4E, 4F, 4G:
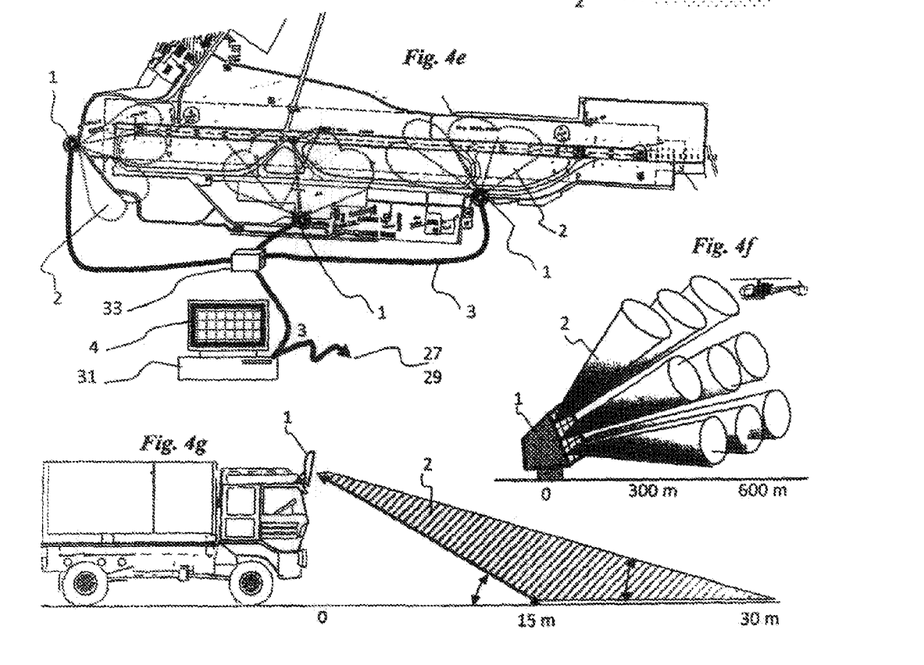

FIG. 4e shows the "surveillance of surfaces": fields, yards, ponds, ports, heliports, airports, railway stations. Every Radar Camera 1 generates fan-shaped radar beams 2, FIG. 1b, to cover the surface of interest, which can have any shape and even buildings in the middle: in fact, simply by placing Radar Cameras also behind them, old masking problems still unsolved with the "monolithic" conventional ground radar become brilliantly solved. Exploring from several points of view, the Radar Cameras achieve multiple data to merge together, thus improving accuracy of readings and enhancing reliability of devices through redundancy; in fact, in case some elements go wrong, the damage is still limited and does not affect the rest of the system, which continues working with a "graceful degradation". According to the invention, the redundancy applies to three different levels, namely: at component level, intending a single antenna circuitry; at assembly level, considering a Radar Camera with many antenna circuitries; at any subsystem level, multiplying not only Radar Cameras 1 but also Connections 3, Displays 4 and Elaborators 5.

In a preferred embodiment, the Radar Cameras 1 comprise electro-optical sensors 29 to watch the scenery, while the relevant Elaborators 5 are connected to the Operative Centre computer 31 through nodal collectors 33 that facilitate data management and flowing; there may be additional devices 27 such as lights, hooters, loudspeakers, transponders, wireless.

Unlike existing radars exploring wide areas—airports—with intense emissions which sometimes air people's grievance, Radar Cameras investigate with infinitesimal microwave emission, totally harmless to people and things: that is, with full ecology and bio-electromagnetic compatibility. Besides, most employed materials are bio-degradable.

The minimum environmental and infrastructural impact of the system facilitate faster installations, not heavy and not dangerous, profitable for low power consumption, with prompt solutions for any urgency of monitoring, control and protect sensitive areas. The modular design offers temporary, partial, progressive installations: with programmable stages, tailored on priorities and available funds, with business investment more feasible and practicable, with more comfortable planning of activities, costs and expected results.

Oriented upwards, the Radar Cameras can perform measurements of height.

FIG. 4f shows the "surveillance of volume" performed by the invention, configured like a stand-alone Radar Camera 1 having antennas arranged in a matrix and creating divergent beams 2, such as to enable measurements in range, angle and height. These are intended for the monitoring of a flight corridor, for the safe driving of aircraft up and down, even in the fog, communicating messages and data to the pilot via radio. This solution is suitable for both stable and improvised heliport, on land, on ships, on buildings, on oil platforms, and can be easily transported to promptly assist helicopters in rescue and emergency operations, in case of fire and smoke, or simply at sport stadium, to control the flight of those committed to shoot from above. In a preferred embodiment, a Display can be used with three-dimensional representations, including holographic ones, to facilitate the interpretation of the flight space.

Figure 1B:
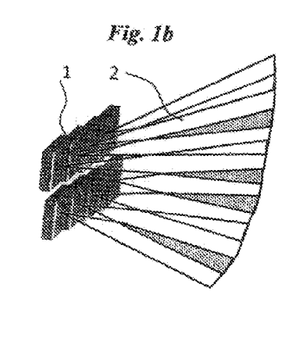
Figure 1C:
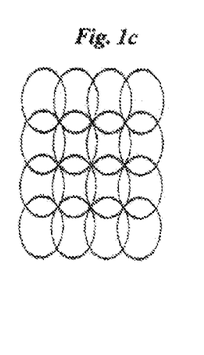

FIG. 1b summarizes that, on concepts already expressed, if a Radar Camera incorporates for example N=8 antennas that produce as many microwave beams 2, and these are partially overlapping, a number comes out of 2N−1=15 angular sectors, into which the angular position of objects can be distinguished on a surface. FIG. 1c instead shows that in the space, with N×N=4×4=16 antennas, the number of angular sectors becomes: $3N^2-2N=40$.

Figure 3F:
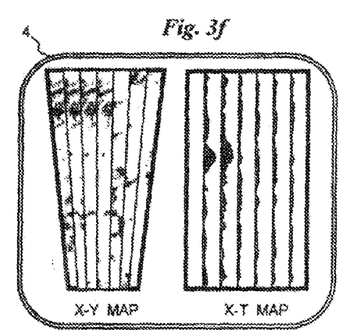

FIG. 4d shows a further embodiment according to the invention, with some aligned Radar Cameras oriented downwards, for soil and subsoil exploration, looking for terrain dishomogenities, buried objects and structures, ducts, pipes, drains, water leakages; and this performance overcomes that of conventional metal-detectors for the great advantage of exploring at a distance, without staying close to the ground, and therefore even beyond hollows, ditches and barriers, while the remote Display 4 reports terrain synthetic images of the radiographic type, in greyscale or false colour, FIG. 3f.

The system according to the invention, being modular, scalable, expandable and adaptable to current and future needs, explicitly permits to include other information sources and tools to become even more intelligent and interactive. In fact, it not only detects the positions and movements of any objects inside the radar coverage, but also identifies them, by means of the electro-optical devices 19, 29, for visual identification, and by means of transponder devices dialoguing with those objects and recognizing them; being these devices integrated through the complementary circuits K. In particular the invention moreover discloses that such transponders are directly obtainable from a special feature of the invention itself, called "intercalation technique of radar signals", explained next.

FIG. 1a includes, for this purpose, a specific circuit M3, which acts on the circuit M2 and then M1 destined to modulate the microwaves generated by the transmitter circuit TX, so as to provide said microwaves also with a complex modulation, by which microwave are exploited to both launch radar signals and to transfer audio, video and data. These in fact are information signals initially managed by the logic circuit L2 of the Elaborator 5, from where they reach the cited circuit M3, which drives the transmission of radar signals intercalated with the transmission of said information signals, in particular transponder interrogations. Vice versa radar echoes and information signals on acquisition, in particular transponder answers, run by the receiver circuits RX up to finally reach the logic circuit L2, which has the double task of processing the echo signals and besides regulating the exchange of information signals between the radar system and the transponder system, that may avail of the complementary circuit K. Hence the normal radar activities result intercalated with the transfer of audio, video and data.

Therefore, according to the invention, a system of fixed Radar Cameras distributed along a route can link many systems of mobile Radar Cameras onboard travelling vehicles, and transfer audio, video and data of all kinds, at the same time and with the same equipment providing radar safety. In particular, said fixed Radar Cameras can automatically activate road lamps, luminous bands or other devices along the route, in order to progressively accompany passing vehicles, especially by night, curves and intersections. This can happen even if vehicles are not equipped with that system, being sufficient their presence be detected by the fixed Radar Cameras, which then promote energy conservation by turning off the road lights when unnecessary.

Definitely, the extreme versatility and adaptiveness of the modular architecture featuring the invention allows a huge variety of technical solutions for security and surveillance flexible applications. Some meaningful applications have been hitherto described, to the purpose of demonstrating not only the capabilities of the invention, but also its details and functioning, to better understand "what" can be done with it, and "how to" do it.

Further important characteristics of the invention are condensed into some special techniques hereunder called: "denied aleatory correlation", "random shift of beat", "dragged synchronism".

The technique called "denied aleatory correlation" makes the invention robust in disturbed environments, from the electromagnetic point of view. A random or pseudo-random or coded or recursive or deterministic generator of time intervals is included into the modulator circuits—that is, within M3 or M2 or M1 in FIG. 1a—and is tasked to interpose predetermined lags on the PRF signal and therefore on the transmission rhythm performed by the circuit TX, according to a specific known rule which also allows the logic circuit L2 of the Elaborator 5 to remove or "deny" such lags consequently present also in the signal received by the circuit RX, so as to regain the correct interpretation of the significant echoes revealing targets.

The technique called "random shift beating" makes the invention even more robust and versatile, for the effect of changing, in a predetermined or else uncorrelated manner, the value of the frequency $f_2$ with a different value $f_3$ or to another value $f_4$ and so on into the formula before referred, in coordination with the filtering means W normally fitted into the receiving chain in order to identify the beat signal that is useful, as related to the formula term: $\cos[2\pi(f_2-f_1)t]$, giving said filtering means the task of dynamically changing the relative response curve to identify also different beat signals related to the formula terms: $\cos[2\pi(f_3-f_1)t]$ or $\cos[2\pi(f_4-f_1)t]$ and so on.

The technique called "dragged synchronism", in addition to the aforementioned technique of metalogical dissection, makes the invention integrated like a whole even though scattered at will into many parts far away. This technique depends on the configuration and the specific installation. To set an example, the FIG. 2b and FIG. 2c show the bow of a boat 24 where the Radar Cameras 1A and 1C are separated, belonging to the respective Elaborators 5A and 5B separated as well; yet the respective microwave beams 2A and 2C overlap in a common central area, to the purpose of discriminating obstacles lying straight ahead as distinct from those lying sideways; in fact an obstacle is recognized in the middle when microwaves transmitted by the Radar Camera 1A are reflected on it and then received back by both the Radar Cameras 1A and 1C. The reception should occur nearly in the same moment, to technically recognize the same central origin of the echoes reaching the two distinct and spaced receivers. Unfortunately this cannot be taken for granted. In fact, if the Elaborators 5A and 5B shared a common signal of synchronization through the cable 3E, the variable length of this cable according to the boat constraints would casually delay such a signal, making it imprecise and then unsuitable. This problem is solved by the invention without any common synchronization signal, but using a special "dragging" function referred to the scheme of FIG. 1a where the transmission signal of the circuit TX can be deferred through the modulator circuits M1 or M2 or M3 on the basis of a specific value, which can be easily set up accordingly to both the system installation and the length of the cable 3E, also by means of the logic circuits L2 and through the Display 4 commands and ports. The practical result is that, through the connecting cable 3E, not only the power supply can be transferred but also at least a specific control signal, exchanged between a pair of Elaborators and having the task of enabling subsequent transmissions properly delayed, in such a way to compensate the electrical propagation delays due to the physical separation of the system parts, and therefore get out a global effect as if they were all an only one body thoroughly integrated with overall performances "real time".

Some favourite compositions of the Radar Cameras 1, essential elements of the invention, are now examined for illustrative and not limitative purpose.

FIG. 5a and FIG. 5b shows a simple Radar Camera having the case with metal fins 34 and other reliefs or recesses 35 for the mounting supports 6; the front side 36 is made of material transparent to the electromagnetic radiation; the opposite side 37 has a connector J; all these parts are furnished by seals against any leakage, thus making the whole waterproof. The case has the inner surfaces coated with non-conducting material 38, to thermically insulate the electronic circuitry housed inside next to the antenna A. This one is supported by metal brackets 39 fastened to the case with non-metallic pins or nylon screws, which also fasten an interposed thermal device 40, preferably a Peltier heat pump, which is flat and provided with thermally conductive rubber on both sides; it exchanges heat on one side with the case 34 and then with the external environment, on the other side with the brackets 39 and consequently with the attached antenna A and circuits, in order to keep them to a constant ideal temperature electronically controlled.

Diverse conflicting requirements—physical, thermal, environmental, mechanical, electronic, electromagnetic—are successfully harmonized with such an arrangement, which is fully "solid state", disclosing a new equipment with unsurpassed performances at low cost, with great robustness and extreme reliability even in harsh conditions with strong temperature range, ambient hazard with powder, liquid, gas, chemical attack, vibration and intense stress.

More generally, an extended configuration features a strong body with a frontal panel 36 protecting many antennas A, B attached to electronic circuits ending to the connector J, and protecting one or more complementary circuits K which may issue in environmental sensors 29 of the electro-optical type to capture images, electro-acoustic to capture sounds, electro-thermal for temperature measurements et cetera, as suitable to increase the knowledge of the supervised area, and moreover including transducers 27 for light and audio local emissions, heathers against ice creation et cetera. Therefore the whole is fully interactive with the surroundings.

FIG. 5c outlines a more complex structure of a Radar Camera made up like a tower or "totem", assembled by one or more layers 41 to be placed one upon the other, each of which containing one or more antennas A, B and environmental sensors 29 that can be individually oriented along different directions, in order to perform horizontal coverage 2A, slanting coverage 2B, upward coverage 2C. The connector J is for totem power supply and data exchange with the rest of the system by cable; moreover telecommunication antennas 3, transducers 27 and photovoltaic devices 28 are applied as needed.

FIG. 5d details a totem layer 41, preferably round or square or polygon-shaped as suitable to form piles, where layers can be individually oriented in different directions and secured with locking means 35. Inside there are the antennas A, B and the environmental sensors 29, all steerable by hand or by servo motor 42, supported by a metallic folding 39 in contact with active thermal devices 40, which exchange heat with the outside by the fins 34 into a chimney 43 crossing the structure, to the purpose of thermally stabilize the electronic circuits 44 attached to the antennas A, B and already considered in the FIG. 1a as the circuits TX, RX, M1, A1, L1, K. Instead the other circuits pertaining to the Elaborator 5—including any complementary circuits K with multiple functions devoted to control environmental sensors 29, transducers 27, servo motor 42, radio link 3—are located in the opposite part inside the layer. Such a design allows quick maintenance without any need of dismantling the "totem", because all cited parts can be easily inspected, regulated and removed just opening the front 36 and rear 37 doors, internally lined with insulating material 38, as well as the walls are.

FIG. 5e shows that preferably the bottom layer of the "totem" is different, because it carries out the mechanical function of pedestal support 6, the ventilation function of the chimney 43 through fan 45 and grid 46, and some basic electronic functions using appropriate circuits K: in order to summon up the connections of the upper layer circuits into a single connector J, to power supply the whole, to refer the totem location from satellite GPS, as useful also for a transponder service even with GSM transceivers or other type of standards like GPRS, UMTS, Internet et cetera.

Of course the global totem structure can change into different arrangements, without change the essence of the invention, and therefore such a "totem" discloses a new compact and complete multifunctional multi-sensor and interactive device, performing integrated simultaneous multidirectional and multispectral measurements: whereas its circuits as above considered use microwaves, acoustic waves, visible, infrared and ultraviolet light, the last one especially for the early identification of flames and fire also far away. So it can validly be the unique and complete outpost to monitor and control a certain area in all conditions of weather, visibility and threat, with automatic and intelligent ability to report alarms and activate appropriate countermeasures, whether autonomously or by a remote centre or by correlation with other similar devices. In fact, many of them can work together without suffering problems of mutual interference, and thus they can be aggregated and distributed at will, to ensure extensive coverages with unmatched performance. They are suitable for installations not only stable but also improvised, because they are small, lightweight, modular and separable by stacking layers, such as to be readily transported and placed wherever needed; their low power consumption allows also battery supply 15, with solar panels 28, and can exchange data with a command and control remote station 31 also via radio link 3 without running cables.

An important element is the microwave antenna. It can be actively driven by the system to get different performances on request, such as broad or focused beamwidth and coverage.

FIG. 5g represents a thin planar antenna of small size, apt to manage microwave beams and condition their profile and side lobes. The radiating surface can be decomposed and recomposed into subsets A', A'', A''' of micro strip patches, with different or combined operation, under selection by means of electronic switches known in the art, to generate dynamic "phased arrays" determining radar beams 2 of different shape, quality and direction, also capable to "electronic steer" the beam.

FIG. 5h represents an antenna with horn structure and parabolic reflector 47, preferable to create very narrow beams, with higher gain, provided with a first pivot 48 and a second one 49 to be turned and exactly positioned.

FIG. 5i summarizes a simpler antenna, having a low contour and a central element inside like a dipole or helical or spiral 50 to generate microwaves polarized as desired, closed by a surface 51 transparent to microwaves except for some portions. It can also be provided with parabolic and conical structure similar to that 47 of the former figure.

Said antennas can be modified and adapted for enhancing some properties when requested by customer applications, and can also take into account the side use of specific materials either conductive or not, like lenses or micro resonant taperings. They are also suitable to be directed fed by two-way transmitting-receiving duplex devices, like the cited circuits TX and RX, which can be made of resonant cavities and microwave diodes or other sophisticated technologies as exemplified next.

Figure 1D:
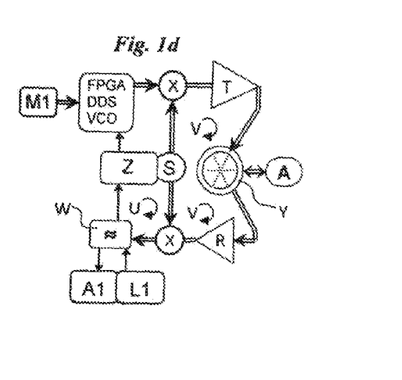

FIG. 1d schematizes a TX and RX united circuit. A device S operates like a stable oscillator and is followed by a mixer device X which also receives the signal synthesized by a modern circuit usually based on FPGA, DDS, VCO—field programmable gate arrays, direct digital synthesizer, voltage controlled oscillator—which is driven by the aforementioned circuit M1. Thus the mixer X outputs a microwave signal that is enhanced by the amplifier T and, through the coupler Y, is finally sent to the antenna A for the transmission. From the same antenna A the received microwaves, running by in the opposite direction, are diverted from the same coupler Y towards the low noise amplifier R, followed by another mixer X, connected to the same device S or to a another one, in such a manner that this mixer rejects the useless microwave components and outputs only the signal of interest, which is then filtered by the circuit W according to parameters set by the aforementioned circuit L1, and finally forwarded to the amplifier circuit A1.

It is worth noting that this schema contains a first feedback loop U and a second loop V useful for the perfect control and stabilization of the transmitted microwaves, by means of the stabilizer circuit Z. The coupler Y can be a microstrip ring type circulator with or without ferrite having a circumference of about six quarters of wavelength, and having the access points spaced in such a way that the weak microwaves from the antenna A entering the ring are in phase when leaving it towards R—because clockwise they run for one quarter of a wavelength and anticlockwise for five quarters—and the same happens for the strong microwaves from the transmitter T passing through the ring towards the antenna A, but these ones come out in opposite phase and zeroed at the exit point towards the sensitive device R, so as to not "dazzle" this one. Such a schema fits the invention, as this is able to work with narrow-band microwaves, just the opposite of the commercial "automotive" radar on the market, that instead require very large bandwidths: at the point that, to not disturb the ordinary broadcasting, they must use microwave frequencies above 70 GHz that unfortunately are unreliable in case of smoke, fog and hydrometeors. Compared to all those radar systems, the invention is distinctive also for this reason, because it can operate in narrow band without disturbing and therefore be permitted to use microwaves below 40 GHz that are effective against hydrometeors, for the sake of reliability with "all weather".

FIG. 5j shows yet another configuration of the invention, with one or more vertical or else horizontal antennas A, B, also facing a reflector 52 in the middle to deflect the antenna beams 2A and 2B towards different directions. Said reflector 52 can be static or mobile to change the beam directions: in elevation, a servo-control 42V may be used, and similarly in azimuth. A preferred embodiment of the invention develops a back and forth antenna rotation, by means of a motor 42H and a driving mechanism 53, so as to perform radar explorations within sectors, even circular. With combined actions of said pointing devices 42V and 42H, any antenna movements can be performed to accomplish radar scanning at will, for example in spiral way or to get punctual knowledge of volumes and surfaces. Besides, to improve such a knowledge, said reflector 52 or mechanism 53 or antennas as well may hold electro-optical sensors 29 and light pointers, also laser type, to address to certain directions or points of interest: for example to indicate hazardous debris detected on road. Such a complete solution can be repeated at regular intervals alongside runways to make them safer, relying on the fact that radar sets according to the invention use independent microwave beams that do not disturb each other, as already explained.

Of course said pointing devices 42V and 42H can also equip an "array" or "matrix" of antennas like that in FIG. 4f, in order to individually address every beam and therefore manage a variety of exploration paths with intelligent criteria computer based. Another choice is to mechanically move the antennas themselves or at least a part of them such as the parabolic reflector 47. Another choice is to electronically steer the beams as aforecited about the FIG. 5g. And of course all the same is true also for the "insect eye" configuration explained before with the FIG. 2d, where all the antennas can be individually driven in order to create many independent steering beams. Then each beam can describe a small fast conical scan, or spiral, in a continuous sequence in chain with adjacent beams, to the purpose of more uniformly exploring all of the hemisphere coverage in a very short time; the resulting performance is absolutely superior to any traditional one achieved with a single scanning antenna that is very slow as compared to the plurality of quick antennas provided by the invention.

Another clever device making such a complex invention very popular anyhow, for facilitating its installation on all sorts of vehicles for immediate delivery, consists of a smart power supply circuit that is included in the cited complementary circuit K, and is able to catch any electricity voltage from any external sources, in particular from batteries, does not matter whether 12 volt or 24 volts or else. Moreover the same circuit is able to exploit the full battery charge up to the end, by commanding reduced settings and workings—reducing the coverage range, or the accuracy, or the updating rate, or the activities of some sensors and devices, partially, totally or periodically, with stand-by et cetera—in order to reduce the consumption of electricity and let it sufficient to only the very essential performances. Finally, especially for extended architectures like in FIGS. 4d and 4e, the same circuit provides an active check of the power supply lines led to the Radar Cameras: in case one them be accidentally crashed, or anyhow the electricity levels into the lines become irregular, the above said clever device recognizes the event and first of all disconnects the afferent lines; as a consequence, a special code normally travelling by the lines is blocked; its absence is noticed by the remote supply source, which then immediately stops the output of electricity and starts a warning. So that any electrical dispersion and hazard are avoided, for the active safety also from this point of view.

According to the invention, the system can become even more intelligent, with the ability to customize the radar exploration and the overall performance, dynamically, on the basis of previous experience, taking advantage of its logic circuit L2 and complementary circuit K to store salient data concerning the explorations, such as the date, time, temperature, environmental conditions, type of the objects investigated, frequency of detections et cetera, also through voice messages. All these data can then be analyzed afterwards, for example to understand the most critical moment occurred during the whole exploration. This analysis can be conducted separately, for example through a standard personal computer with a USB port or infrared or wireless WAP or Bluetooth, transferring data with a corresponding port or socket provided in the invention as well by means of the complementary circuits K, as in the specimen of the FIG. 3a, useful for direct connections also with modems, printers, plotters and other means, in particular those asked to interact with the system internal circuitry for diagnostic and maintenance, to read or update data and parameters.

All the described configurations and many others can be set up by experts in the field without difficulty, using materials and components in common use.

Ultimately, the most important aspect of the invention lies in the extremely flexible and adaptive architecture of a multipurpose entire surveillance system, which can be assembled through specific basic modules—Radar Cameras, Elaborators, Displays, connection media—which can be spaced, approached, combined at will as never previously done in other systems. The "multiple independent radar beams autonomously working at the same time in the same place and in the same band", that is the "isofrequencial" approach, is absolutely unique. Such a feature makes it possible the practical use and the mass production of the Radar Cameras in large quantities: be they combined to develop a big system, or be they self-contained together with own Elaborator and Display, up to become miniaturized and even wearable.

FIG. 5k in fact discloses a very compact solution, where the whole system is distributed and packed all in a hat. The radar beams are produced by miniaturized antennas A, B and the output information to the user is given through appropriate transducers 27 that may be ear-plugs, headphones, special glasses or even tactile stimulators.

Instead of the hat, special goggles can host the invention, with the antennas A and B in place of the lenses; on the rear side of which two special thin Displays 4 are attached, to perform even stereoscopic effects; with stereophonic ear-plugs 27 in the bars and so on.

FIG. 5l outlines an even more compact solution in the form of a portable torch, having at one end the microwave miniaturized antenna A, at the other end the removable cap 37 for introducing a battery 15 preferably rechargeable, which receives the electric power from a connector J or from a circuit with inductive coupling coil. The already considered radar circuits are all concentrated inside the handle, which displays some sensorial transducers 27 to create vibrations or other sensations for the fingers of a person, with a variety of effects communicating the radar measurements by the sense of touch; other transducers may be associated as well, like wireless ear-plugs. This solution is conceived especially for people with sight problems, to let them range freely over the environment in which they are, beyond the limited range of their arms or the walking stick for the blind.

In particular, the antenna A can be equipped with an environmental sensor 29, for example with a piezoelectric transducer emitting and receiving ultrasounds, so as to combine radar data and ultrasounds data—sonar—in order to get an improved perception of the surroundings. For this purpose the antenna of the FIG. 5i may be convenient, since its surface 51 has a central small portion without microwave emission that can be used to fix the aforesaid transducer 29.

Many comfortable features can be added as well: such as a beeper to recover this miniaturized system when lost around, a warning of the battery charge, a remote control or even a telephone transceiver for communications or commands at a distance, a decoder of data and information in the form of tactile, acoustic, or even video stimuli, as convenient for the user. Then the invention in the form of portable torch may help a disabled person, visually impaired, hearing impaired, paralytic, on wheel-chair, to understand the around situation when staying in particular places. For example, standing near a pedestrian traffic light, he can get additional information to cross the road; at the bus stop, he can know which coach is coming; of course being traffic lights and buses equipped with transponders as well. This may be derived in accordance with the present invention applied to fixed or mobile means, such as sufficiently suggested by the FIG. 2a, 4g, 5f.

It has been chosen to give details and explanations on various applications of the invention, to avoid being copied and mystified even just availing of the method of using.

The invention claimed is:

1. Surveillance system for detecting one or more objects, comprising:
    at least one radio-wave camera for gathering information on the one or more objects comprising an antenna for generating a radar beam, at least one elaborator in communication with the at least one radio-wave camera for processing the information gathered by the at least one radio-wave camera, and a display device in communication with the at least one elaborator for displaying the information processed by the at least one elaborator;
    wherein the antenna comprises transmitting circuits and receiving circuits for transmitting and receiving radio signals, the transmitting circuits being connected to first modulator circuits and the receiving circuits being connected to first amplifier circuits, to first logical circuits for local functions, and to complementary circuits for data exchange functions,
    wherein the at least one elaborator comprises:
        oscillator circuits;
        comparators provided with second logical circuits and second amplifier circuits;
        frequency dividers operatively connected to the oscillator circuits and the comparators;
        counters in operative communication with the oscillator circuits, the frequency dividers and the comparators;
        second and third modulator circuits operatively communicating with the oscillator circuits, the frequency dividers and the comparators; and
        complementary circuits and interface circuits for establishing connections among the at least one elaborator, the display device, and the radio-wave camera.

2. The surveillance system according to claim 1, further comprising an electro-optical sensor for measuring environmental luminosity, wherein the display device comprises luminous spots, graduated references, service indicators and message areas brightening according to the environmental luminosity measured by the electro-optical sensor;

the display device further comprising controls for switching the system on and off, for activating acoustic transducers, and for performing additional functions such as maintenance.

3. The surveillance system according to claim 1, wherein the first logic circuits and the second logical circuits are provided with electronic keys and memories for recording historical events, recognizing critical or emergency situations, and giving automatic alarms through the complementary circuits.

4. The surveillance system according to claim 1, further comprising a mechanical fixture for supporting the radio-wave camera, said mechanical fixture comprising collimators and encoders for settling the positions of the radio-wave camera and consequently the directions of the generated radar beams.

5. The surveillance system according to claim 1, wherein the at least one radio-wave camera, the elaborator, and the display device form a modular system configured such that each part of the modular system is dismountable, reconfigurable and re-assemblable.

6. The surveillance system according to claim 1, further comprising environmental sensors for detecting physical data from surrounding environment, said environmental sensors being connected to the at least one elaborator, and comprising electricity sensors for intelligent power supply management and for actively performing electrical safety against failure and accidents.

7. The surveillance system according to claim 1, wherein the radio-wave camera comprises a case for housing the antenna, said case being provided with fins for warmth dissipation, with non-conducting material for thermally insulating an interior of the case from the outside, and with rubber rings for being water-proof.

8. The surveillance system according to claim 1, wherein the radio-wave camera comprises one or more layers placed one upon the other so as to form a tower, each layer containing one or more antennas and environmental sensors able to be individually oriented along different directions.

9. The surveillance system according to claim 1, further comprising a first mixer connected to an oscillator device and to at least one programmable device, a direct digital synthesizer and a voltage controlled oscillator, said at least one programmable device being driven by a modulator circuit, said first mixer being able to forward signals to an antenna through a power multiplier device and a coupling device, said system further comprising a second mixer able to receive signals from the antenna by the coupling device and an amplifier device (R) and to be connected to the oscillator device and to a filtering device.

10. The surveillance system according to claim 2, further comprising projection devices to improve detection of the one or more objects in space.

11. The surveillance system according to claim 1, wherein the at least one radio-wave camera includes a plurality of radio-wave cameras, each comprising at least an antenna generating a radar beam, the plurality of radio-wave cameras forming an interactive system, wherein the antennas of the plurality of radio-wave cameras transmit at the same time and on the same frequency band.

12. The surveillance system according to claim 11, wherein mutual interference among different ones of the radar beams is avoided by at least one of:

a circuit that acts on the modulator circuits of the amplifier circuits and the logic circuits;

transponder interrogations;

a generator of time intervals in the modulator circuits making the transmitting circuits perform a transmission rhythm;

changing frequency signals in a predetermined or uncorrelated manner;

filters configured to identify signals based on a frequency thereof; and configuring the modulator circuits to defer transmissions signals of transmission circuits.

13. The surveillance system according to claim 11, wherein the antennas are arrangeable according to different geometric configurations.

14. The surveillance system according to claim 11, further comprising a control device steering each antenna independently of one another.

15. The surveillance system according to claim 1, wherein the system is suitable for terrestrial, nautical, and/or avionic applications and wherein the system is fixed or movable relative to the object to be detected.

* * * * *